United States Patent [19]
Chancey et al.

[11] Patent Number: 5,842,185
[45] Date of Patent: Nov. 24, 1998

[54] METHOD AND SYSTEM FOR ELECTRONICALLY TRACKING FINANCIAL TRANSACTIONS

[75] Inventors: Jason D. Chancey, Redwood Shores; Scott D. Cook, Woodside; Lisa Jean Borden, Hayward, all of Calif.

[73] Assignee: Intuit Inc., Menlo Park, Calif.

[21] Appl. No.: 275,038

[22] Filed: Jul. 14, 1994

Related U.S. Application Data

[63] Continuation of Ser. No. 19,468, Feb. 18, 1993, abandoned.

[51] Int. Cl.[6] .................................................. G06F 17/60
[52] U.S. Cl. .............................. 705/40; 705/35; 902/24
[58] Field of Search ............................... 364/408, 401, 364/406; 283/57, 58, 59–60.1, 64.1; 705/1, 16, 17, 21, 35, 39, 40, 42, 43; 235/379–380, 385; 902/24

[56] References Cited

U.S. PATENT DOCUMENTS

| | | | |
|---|---|---|---|
| 4,321,672 | 3/1982 | Braun et al. | 364/408 |
| 4,346,442 | 8/1982 | Musmanno | 364/408 |
| 4,948,174 | 8/1990 | Thomson et al. | 283/58 |
| 5,138,549 | 8/1992 | Bern | 705/31 |
| 5,220,501 | 6/1993 | Lawlor et al. | 705/43 |
| 5,483,445 | 1/1996 | Pickering | 705/40 |
| 5,500,513 | 3/1996 | Langhans et al. | 235/380 |
| 5,621,201 | 4/1997 | Langhans et al. | 235/380 |
| 5,684,965 | 11/1997 | Pickering | 705/34 |

OTHER PUBLICATIONS

Custom Billing Disk Product from Pacific Bell, Sep. 1990 (5 pages).
Quicken User Manual, Version 3 for Macintosh, by Bob Schulman, Joseph Schrader, Jacobs; Intuit; Chapter 17, pp. 239–246 (plus cover and inside pages), first printing May 1991.
San Francisco Chronicle, Dec. 12, 1991, "Electronic Visa".

*Primary Examiner*—Frantzy Poinvil
*Attorney, Agent, or Firm*—Fenwick & West LLP

[57] ABSTRACT

A system and method automatically enters financial transactions such as credit card transactions into a financial account stored in a computer. A financial statement incorporating the transactions is provided in an electronic form understood by the computer, such as a computer data file, for updating the financial account. For a credit card account, the electronic statement includes one or more credit card transactions such as purchases. Before accepting the electronic statement, the process verifies that the electronic form of the statement has not been altered since its creation and therefore correctly reflects transactions in the original statement. In the process of entering the transactions, they are tracked by automatically assigning them to expense categories. First the process determines from the electronic statement if a payee for a transaction is of record in the computer and, if so, assigns the transaction to a category already associated with the payee. If not, the process next determines from the electronic statement a merchant category code such as a Standard Industry Code (SIC). The merchant category code is associated with a category recognized by the computer, and the transaction is assigned to the recognized category. If no recognized category exists, the process prompts the user for a category to which the transaction can be assigned.

36 Claims, 3 Drawing Sheets

53

| STATEMENT DATE | NEW BALANCE | MINIMUM PAYMENT | PAYMENT DUE DATE |
|---|---|---|---|
| 6/1/92 | 1,684.05 | 35.00 | 6/26/92 |

| ? | DATE | PAYEE | AMOUNT | CATEGORY |
|---|---|---|---|---|
| | 5/1/92 | TOM'S SOUTHBAY SHELL | 15.26 | AUTO:FUEL |
| | 5/9/92 | ROGERS REMODELING | 411.65 | HOME REPAIR |
| | 5/18/92 | KNEISLEY SPORTS CENTER | 224.41 | RECREATION |
| | 5/2/92 | JJ'S STEREO SHOP | 165.83 | ENTERTAIN |
| | 5/5/92 | ROBBINS CLINIC | 58.00 | MEDICAL |
| | 5/30/92 | CHEZ JESPER RESTAURANT | 39.29 | DINING |
| | 5/8/92 | TOM'S SOUTHBAY SHELL | 17.18 | AUTO:FUEL |
| | 5/24/92 | FABULOUS FASHIONS BY TERRY | 287.67 | CLOTHING |
| | 5/18/92 | JASON'S TRAVEL | 181.47 | TRAVEL |
| | 5/2/92 | BORDEN BOOKSTORE | 36.43 | RECREATION |
| | 5/4/92 | JEFF'S VOLVO | 173.58 | AUTO:SERVICE |
| | 5/14/92 | DEL G NETWORK SPECIALTIES | 113.37 | COMPUTER |
| | 5/1/92 | PAYMENT | 468.12 | (JOINT CHECKING) |

[MARK] [RECORD ALL] [CANCEL] [CATEGORIZE] [DELETE CAT.]

FIG. 4

METHOD AND SYSTEM FOR ELECTRONICALLY TRACKING FINANCIAL TRANSACTIONS

RELATED APPLICATIONS

This is a continuation of application Ser. No. 08/019,468 filed on 18 Feb. 1993, abandoned.

FIELD OF THE INVENTION

This invention generally relates to data processing systems for electronically tracking financial transactions. More particularly, this invention relates to such a system for tracking the entry of credit card transactions or the like by category into a financial account stored in a computer.

BACKGROUND OF THE INVENTION

Computer programs for electronically tracking financial transactions to balance checkbooks, follow investments, pay bills and the like have become increasingly popular as the capability of such programs has increased. Financial management programs today allow a user to track the nature of financial transactions—whether by check, cash or credit card—by categorizing each transaction as a particular type of income or expense. For example, with the electronic checkbook feature of these programs, a user may track the amount of money he or she spends on taxes, clothing, dining out, etc., by assigning each check to an appropriate category. The user may then have the program generate a report periodically to determine the amounts in each category. Many users find this feature extremely helpful for preparing tax returns or keeping within a budget.

However, manually entering each transaction in the electronic checkbook and selecting the appropriate category is time-intensive. The process may be automated to some degree by the use of features that automatically enter the payee, the category and even the amount for recurring transactions, such as mortgage payments, utility bills and the like. But many transactions are unique, and for these the user must manually enter all of the information.

The problem is especially acute with credit card transactions, which, unlike checks, are typically not recorded by a user in a register at the time of purchase. Instead, the user is given a charge slip for checking against a monthly statement that arrives weeks later. To help credit card users track credit card transactions, these financial computer programs provide a credit card account that, like the electronic checking account, allows the user to enter each transaction into a credit card register and, if desired, the appropriate category. But the user must still keep track of all charge slips and manually enter the information from them into the register. These two impediments may serve to discourage all but the most persevering users from the task. Consequently, it is difficult to accurately track the nature of expenses with these financial computer programs if the user regularly uses a credit card, debit card or equivalent device.

An object of this invention, therefore, is to overcome this drawback of prior financial computer programs by automating the entry of financial transactions into the appropriate financial account—whether it is a credit card account, a checking account, or another account. More particularly, an object of this invention is to automate the selection of a category for each transaction even if the user has not previously assigned a category to the payee involved.

SUMMARY OF THE INVENTION

The invention is a novel computerized method and system for automating the entry of transactions into a financial account stored in a computer. The invention simplifies and improves what heretofore has been a tedious, manual task of entering and tracking such transactions.

In one aspect, the invention comprises a computerized method and system for providing a financial statement such as a credit card statement in an electronic form understood by the computer, such as a computer data file, for updating a financial account. The data file may take whatever form is suitable for its communication to the computer, such as a data file for transmission by way of a modem or a data file for transmission by way of a storage medium, for example, a floppy disk. The electronic statement includes one or more financial transactions, such as purchases. Before accepting the electronic statement, it is first verified that the electronic form of the statement has not been altered since its creation and therefore correctly reflects transactions on the original statement. The transactions in the electronic statement are then stored in the financial account within the computer.

In another aspect, the invention comprises a computerized method and system for assigning financial transactions such as credit card transactions to categories. This assignment occurs in the process of entering the transactions into a financial account stored in a computer. One form of the method includes determining from the electronic statement if a payee for a transaction is of record in the computer and, if so, assigning the transaction to a category already associated with the payee. Another form of the method includes determining from the electronic statement a merchant category code such as a Standard Industry Code (SIC). The merchant category code is associated with a category recognized by the computer, and the transaction is assigned to the recognized category. If no recognized category exists, the method may prompt a user for selection of a category for association with the merchant category code. The two methods may be combined wherein the merchant category code is checked only if the payee for a transaction is not of record in the computer. The invention may also take the form of systems related to these methods.

The invention thus includes a method and system for electronically tracking financial transactions in a fast and accurate manner.

The foregoing and other objects, features, and advantages of the invention will become more apparent from the following detailed description of a preferred embodiment which proceeds with reference to the following drawings.

BRIEF DESCRIPTION OF THE DRAWINGS

FIG. 4 is a screen display of an electronic statement in a visual form.

DETAILED DESCRIPTION OF A PREFERRED EMBODIMENT

The present invention is an improvement to financial management computer programs such as Quicken® available from Intuit of Menlo Park, Calif. The design, structure and operation of such prior programs is well understood by those of ordinary skill in the art and need not be described in detail here. However, several features of the prior art are generally described below to provide an understanding of how the present invention works within a financial management program. It should be understood, though, that the present invention can be practiced separately from such prior programs, if desired.

Figures 1, 2:
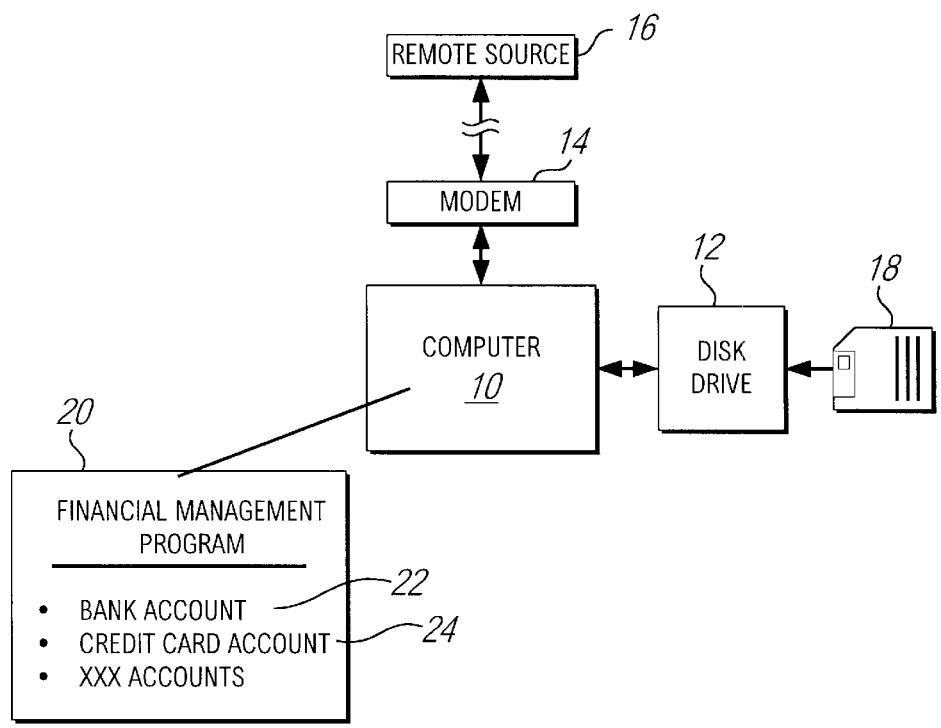
FIG. 1 is a block diagram of a conventional computer system which may be used with a financial management program.
FIG. 2 is a screen display of a register of a financial account such as a credit card account within a financial management program.

FIG. 1 is a block diagram of a conventional computer system which may be used with a financial management program. A computer 10 is shown coupled to a disk drive 12 and a modem 14, all of conventional design. The modem 14 is used to communicate over telephone lines with a remote source 16 such as an on-line utility service. The disk drive 12 is used to read information from or write information to a floppy disk 18. The computer 10 (which typically includes a video display terminal, keyboard and mouse, and other peripherals) can execute computer programs such as a financial management program 20. The program 20 may include a number of features such as a bank account 22 (checking, savings and the like), a credit card account 24 and other accounts. Through registers that are graphically displayed by the computer 10 on the video display terminal, a user can track income and expenditures from these accounts more quickly and accurately than through paper registers.

A conventional credit card account is similar to a bank account, except it is used to track credit card transactions. FIG. 2 shows the screen display of a credit card register 26 associated with a credit card account 24. The register 26 includes a number of fields such as Date, Payee, Category (such as Home Repair or Clothing), Charge, C (cleared) and Balance. "Category" refers to the type of income or expense involved in a financial transaction. The term "financial transaction" is not limited to purchases, but includes credits, payments, balance due, interest, and related statement information. And the term "payee" is not limited to a party but includes any identifier of a transaction, such as "service charge," "payment," "credit," etc., that appears on a statement. For example, expense categories may include food, mortgage interest paid and utilities. Income categories may include salary, bonuses, interest income and dividends. Standard categories are those that are recognized by the financial management program, which typically has several dozen. Other categories may be added by the user. "Cleared" indicates whether a particular transaction was cleared (checked) in reconciling the account with a monthly credit card statement. For each financial transaction, the user must enter the date, payee, category and charge. The program typically determines the balance. A user may enter each transaction as it occurs or may wait until he or she receives the monthly paper credit card statement and enter all transactions at one time. Either way, the manual task is time consuming and prone to error.

Reconciling a conventional credit card account ensures that it contains accurate information. A user checks transactions in the register 26 against transactions listed in the paper credit card statement and clears those transactions that appear in both. Errors are detected when the statement shows a transaction not entered by or that is different from what the user has entered in the register. Uncleared transactions are those that have not yet appeared in a statement. After reconciling the account and payment of the bill, the register 26 shows the unpaid balance.

The category information entered for each credit card transaction is often as important as the charged amounts. This information is included in reports generated by the financial program detailing income and expenses, such as for taxes, tax-deductible items, entertainment, savings and the like. In entering category information for new parties, a user must first determine the appropriate category and the type or otherwise select it for inclusion in the register. For previous parties, a previous transaction may be recalled, entered again and then modified in amount if necessary.

The present invention eliminates the need to manually enter financial transactions into a financial account. Rather than receiving a paper credit card statement, for example, for entering credit card transactions and reconciling the account, the invention utilizes a credit card statement in an electronic form understood by the computer 10. This electronic statement is a computer data file suitable for communication to the computer 10 from a remote source 16 by way of the modem 14 or equivalent remote communication device, such as facsimile machine, ISDN, etc. Or the electronic statement may be a data file suitable for communication to the computer 10 by way of a storage medium such as a floppy disk 18. The electronic statement, like the paper statement, includes credit card transactions such as credit card purchases, finance and cash advance charges, credits from merchants, payments and the like.

Figure 3:
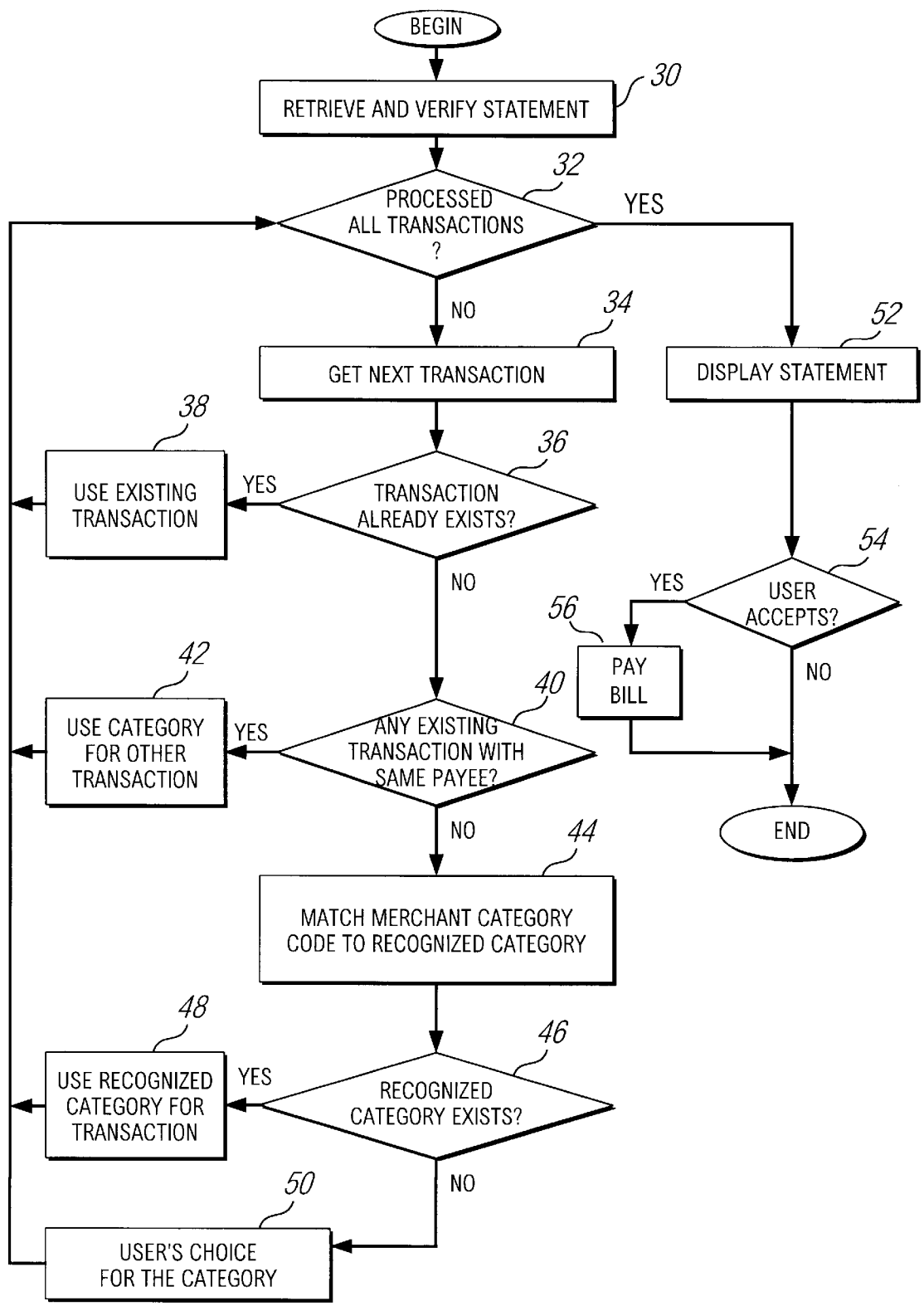
FIG. 3 is a flow chart illustrating the data processing of financial transactions from an electronic statement into a financial account according to the invention.

FIG. 3 is a flow chart illustrating an embodiment of the invention for processing credit card transactions from an electronic credit card account 24. The first step 30 is to retrieve and verify the electronic statement. The statement is retrieved by using information provided by the user to determine the media where the statement is physically located. For example, in setting up a credit card account that takes advantage of the invention, the user is prompted to indicate whether the electronic statement is located at a remote source 16 such as an on-line utility service or on a floppy disk 18. With this information, the process establishes a connection to the media containing the electronic statement:, locates the statement on the media and obtains the statement. To verify the correctness of the electronic statement, a checksum is calculated while retrieving the statement. The calculated checksum value is then compared to a checksum value stored within the electronic statement data to verify that the statement has not been altered since its creation. If there is a difference, the user is alerted and the retrieved statement is not used.

In a following step 32, the electronic statement is checked to see if all transactions have been processed. If not, the next transaction is read from the statement and is checked to determine if the transaction has already been manually entered into the credit card account 24 (steps 34, 36). This may occur, for example, if a user regularly enters transactions manually to keep a running balance of his account. If a transaction is already present, its information is used and the credit card transaction in the electronic statement is ignored (step 38). Processing proceeds with reading the next transaction if one exists (steps 32, 34).

If the credit card transaction is not already present in the account 24, the process determines if the payee is of record in the computer 10 (step 40). The process may do so by searching previous transactions or equivalent data for the same payee. If successful, the process assigns the transaction to the same category used in the previous transaction because that category is already associated with the payee (step 42). However, this assignment is not irrevocable; it may be changed by the user before a final acceptance of the electronic statement, as will be explained.

If the process fails to locate a previous transaction with the same payee, then the process determines from the statement a merchant category code associated with the present transaction (step 44). This category code, such as the Standard Industry Code, is a number that corresponds to a description of the payee's primary business or description of the type of transaction, such as service charge, credit, and the like, and is present in financial statements such as credit card statements. For example, a restaurant's merchant category code may be 5812, and a credit may have the category code 2100. The process constructs a look-up table in the memory of the computer for associating, or translating, merchant category codes with categories recognized by the process. In the example above, the process might associate the 5812 code with a recognized category such as "Dining." Assuming an association exists, the process assigns the present transaction to the recognized category (steps 46, 48).

However, the look-up table is not necessarily complete, and a recognized category for a merchant category code may not exist in the present credit card account 24 (step 46). In this event, the user is prompted to select a category for association with the merchant category code (step 50). This selection may either be an unrecognized category suggested by the process or a recognized category chosen by the user from a list of recognized categories. If the unrecognized category is selected, the process adds it to the list of recognized categories.

Once all transactions in the electronic statement have been processed (step 32), the process displays the statement to the user in visual form for acceptance, cancellation or modification (step 52). FIG. 4 is a screen display of an electronic financial statement 53, showing all transactions as processed. Note the assignment of each transaction to a category, where appropriate. With the statement displayed, the user may mark a transaction for further review with a "?", check and change categories, change the payee or the like. If the electronic statement is unacceptable, the user may cancel it (step 54) and the transactions are not recorded in the credit card account 24. If the statement is accepted, the user is prompted to pay the bill (steps 54, 56). The prompt may offer various payment options, such as the bank accounts 22 from which the user may pay the bill; whether the check is hand written, generated by the financial management program or electronic; and the amount of the bill to be paid. Payment is then automatically deducted from a selected bank account 22.

The means for performing the above process may be a computer program or an equivalent hardware implementation. The steps of the process may also be varied in arrangement, if desired, to produce an equivalent process.

Having illustrated and described the principles of the invention in a preferred embodiment, it should be apparent to those skilled in the art that the invention can be modified in arrangement and detail without departing from such principles. For example, the invention is not limited in use to credit card accounts, but may be used with other equivalent financial accounts as well. Features of the invention shown in software may also be implemented in hardware if desired.

Therefore, the illustrated embodiment should be considered only an example of the invention and not a limitation on its scope, which is defined in the following claims. We therefore claim as part of the invention all modifications and equivalents to the illustrated embodiments coming within the scope and spirit of these claims.

We claim:

1. A computer-implemented process for entering transactions included in a remotely compiled electronic statement into a financial account stored in a local computer system including a processor and a storage device, comprising the steps of:

compiling with a remote processor in the remote computer system an electronic statement including at least one transaction, the transaction including a payee, the electronic statement in an electronic data format processable by the local computer system;

communicating the electronic statement to the local computer system via a communication medium;

storing the electronic statement in the storage device of the local computer system;

for at least one transaction in the electronic statement:
determining with the processor if a payee of the transaction is the payee of a previous transaction stored in the storage device;
if the payee for the transaction is the payee of a previous transaction stored in the storage device, assigning with the processor the transaction to a category associated with the previous transactions; and
storing the transaction with the assigned category in the financial account in the storage device.

2. The computer-implemented process of claim 1 wherein the communication medium is an electronic telecommunication link coupling the remote computer system and the local computer system.

3. The computer-implemented process of claim 1 wherein the communication medium is a portable non-volatile storage medium.

4. The computer-implemented process of claim 1, further comprising the steps of:

displaying the electronic statement on a display of the local computer system for acceptance or cancellation by a user;

receiving an input for canceling or accepting the electronic statement;

if accepted, prompting the user on the display to generate a financial transaction for paying a bill associated with the electronic statement;

generating the financial transaction for paying the bill; and storing the financial transaction in the financial account in the storage device.

5. The computer-implemented process of claim 1, wherein:

the financial account is a credit card account;

the transactions are credit card transactions; and the electronic statement is a credit card electronic statement.

6. The computer-implemented process of claim 1, wherein each transaction in the electronic statement includes a merchant category code, the process further comprising the steps of, if the payee for the transaction is not a payee of a previous transaction stored in the storage device:

determining with the processor from the electronic statement a merchant category code included in the transaction;

determining with the processor if the merchant category code is associated with a category in the storage device; and if the merchant category code is associated with a category in the storage device, assigning with the processor the transaction to the category associated with the merchant category code; and storing the transaction with the assigned category in the financial account in the storage device.

7. The computer-implemented process of claim 6, further comprising the steps of, if the merchant category code is not associated with a category in the storage device:

prompting on a display of the local computer system for an input by a user of a category for associating with the merchant category code;

associating with the processor the merchant category code with the category; and, storing the association in the storage device.

8. The computer-implemented process of claim 6, wherein the step of determining with the processor if the merchant category code is associated with a category in the storage device comprises the substep of consulting a look-up table stored in the storage device, the look-up table associating each category with at least one merchant category code.

9. The computer-implemented process of claim 1 further comprising the steps of:

determining with the processor if the financial transaction in the electronic statement has been manually entered as a transaction into the financial account and stored in the storage device; and if the financial transaction has been manually entered, ignoring the financial transaction in the electronic statement.

10. The computer-implemented process of claim 1, further comprising the step of, before storing the transaction, verifying with the processor that the electronic statement has not been altered since its creation by the remote computer system.

11. The computer-implemented process of claim 10, wherein the verifying step comprises the substeps of:

calculating with the processor a checksum for the electronic statement; and comparing with the processor the calculated checksum with a checksum value determined by the remote computer system and stored within the electronic statement prior to communicating the electronic statement to the local computer system.

12. A computer-implemented process for entering transactions included in a remotely compiled electronic statement into a financial account stored in a local computer, comprising the steps of:

compiling with a remote processor in the remote computer system an electronic statement including at least one transaction, the transaction including a merchant category code, the electronic statement in an electronic data format processable by the local computer system;

communicating the electronic statement to the local computer system via a communication medium;

storing the electronic statement in the storage device of the local computer system;

associating with the processor at least one merchant category code with at least one category, and storing each association in the storage device;

for at least one transaction in the electronic statement:

determining with the processor from the electronic statement a merchant category code included in the transaction;

determining with the processor if the merchant category code is associated with a category in the storage device;

if the merchant category code is associated in the storage device with a category, assigning with the processor the transaction to the category associated with the merchant category code; and storing the transaction with the assigned category in the financial account in the storage device.

13. The computer-implemented process of claim 12, further comprising the steps of, if the merchant category code is not associated in the storage device with a category:

prompting on a display of the local computer system for an input by a user of a category and associating the merchant category code with the input category, associating with the processor the merchant category code with the category; and, storing the association in the storage device.

14. The computer-implemented process of claim 12 wherein the communication medium is an electronic telecommunication link coupling the remote computer system and the local computer system.

15. The computer-implemented process of claim 12 wherein the communication medium is a portable non-volatile storage medium.

16. The computer-implemented process of claim 12, further comprising the steps of:

displaying the electronic statement on a display of the local computer system for acceptance or cancellation by a user; and if accepted, prompting the user on the display to generate a financial transaction for paying a bill associated with the electronic statement;

generating the financial transaction for paying the bill; and storing the financial transaction in the financial account in the storage device.

17. The computer-implemented process of claim 12, wherein:

the financial account is a credit card account;

the transactions are credit card transactions; and the electronic statement is a credit card electronic statement.

18. The computer-implemented process of claim 12, further comprising the step of, before storing the transaction, verifying with the processor that the electronic statement has not been altered since its creation by the remote computer system.

19. The computer-implemented process of claim 18, wherein the verifying step comprises the substeps of:

calculating with the processor a checksum for the electronic statement; and comparing with the processor the calculated checksum with a checksum value determined by the remote computer system and stored within the electronic statement prior to communicating the electronic statement to the local computer system.

20. The computer process of claim 12, wherein the step of determining with the processor if the merchant category code is associated with a category in the storage device comprises the substep of consulting a look-up table stored in the storage device, the look-up table associating each category with at least one merchant category code.

21. A computer system for entering transactions included in a remotely compiled electronic statement into a financial account stored in a local computer system, comprising:

a remote computer system, remotely situated from the local computer system, including:

a remote processing device programmed to compile from at least one selected transaction in the remote storage device an electronic statement in an electronic data format processable the local computer system, the electronic statement including at least one transaction, each transaction including a payee;

a communication device, operatively coupled to receive the electronic statement from the remote processing device, the communication device electronically communicating the electronic statement to the local computer system via a communication medium; and a local computer system including:

a storage device for storing transactions, and categories in the financial account;

an input device having a communicative coupling with the communication medium to receive the electronic statement, the input device further coupled to the storage device to store therein the electronic statement;

a processor operatively coupled to the storage device for fetching transactions and categories from the storage device, the processor programmed to:

determine, for at least one transaction in the electronic statement received from the remote computer system, if the payee of the transaction is a payee of a previous transaction stored in the financial account in the storage device and, is so, for assigning the transaction to a category associated with the previous transaction in the financial account; and further programmed to store the transaction witht he assigned category in the financial account in the storage device.

22. The system of claim 21 wherein the communication medium is an electronic telecommunication link coupling the remote computer system and the local computer system.

23. The system of claim 21 wherein the communication medium is a portable non-volatile storage medium.

24. The system of claim 21 wherein:

the financial account is a credit card account;

the transactions are credit card transactions; and the electronic statement is a credit card electronic statement.

25. The system of claim 21, wherein the processor of the computer system is further programmed to:

determine a merchant category code included in the transaction if the payee of the transaction is not a payee of a previous transaction stored in the storage device;

to determine if the merchant category code included in the transaction is stored in association with a category in the storage device; and to assign the transaction to a category stored in association with the merchant category code and to store the assigned transaction in the storage device.

26. The computer system of claim 25 wherein the processor determines if the merchant category code included in the transaction is stored in association with a category in the storage device with a look-up table.

27. The computer system of claim 21, wherein the processor verifies that the electronic statement has not been altered since its creation by the remote computer system.

28. The computer system of claim 27, wherein the processor is further programmed to:

calculate a checksum for the electronic statement; and compare the calculated checksum with a checksum value determined by the remote computer system and stored within the electronic statement prior to the communicating the electronic statement to the local computer system.

29. A computer system for entering transactions included in a remotely compiled electronic statement into a financial account stored in a local computer system, comprising:

a remote computer system including:

a remote processing device programmed to compile an electronic statement in an electronic data format processable by the local computer system, the electronic statement including at least one transaction, each transaction including a merchant category code;

a communication device, operatively coupled to receive the electronic statement from the remote processing device, the communication device electronically communicating the electronic statement to the local computer system via a communication medium; and a local computer system including:

a storage device for storing transactions in the financial account, and for storing a plurality of merchant category codes, and categories;

a first input device having a communicative coupling with the communication medium to receive the electronic statement, the input device further coupled to the storage device to store therein the electronic statement;

a second input device operating to receive categories input by a user;

a processor operatively coupled to the storage device and the input device for fetching transactions, merchant category codes, and categories from the storage device; the processor programmed to:

associate a merchant category code with at least one category received with the second input device, and to store the merchant category code in association with the received category in the storage device;

to receive the electronic statement from the remote computer system via the communication medium and to store the electronic statement in the storage device;

to determine for at least one transaction in the electronic statement received from the remote computer system the merchant category code included in the transaction;

to determine if the merchant category code included in the transaction is stored in association with a category in the storage device; and to assign the transaction to a category stored in association with the merchant category code, and to store the assigned transaction in the financial account stored in the storage device.

30. The computer-implemented system of claim 29 further comprising a look-up table, wherein the the processor stores the association between each merchant category code and a category in the look-up table, and wherein the the processor determines from the look-up table if the merchant category code is associated with a category.

31. The computer-implemented system of claim 29 further comprising in the local computer system a display device, wherein the processor, responsive to the merchant category code not being stored in association with a category in the storage device, prompts on the display device for an input by a user of a category for associating with the merchant category code in the storage device.

32. The system of claim 29 wherein the communication medium is an electronic telecommunication link coupling the remote computer system and the local computer system.

33. The system of claim 29 wherein the communication medium is a portable non-volatile storage medium.

34. The computer system of claim 29, wherein:

the transactions are credit card transactions;

the transactions are credit card transactions; and the electronic statement is a credit card electronic statement.

35. The computer system of claim 29, wherein the processor verifies that the electronic statement has not been altered since its creation by the remote computer system.

36. The computer system of claim 35, wherein the processor is further programmed to:

calculate a checksum for the electronic statement; and compare the calculated checksum with a checksum value determined by the remote computer system and stored within the electronic statement prior to communicating the electronic statement to the local computer system.

* * * * *